June 25, 1957 R. M. DOLBY ET AL 2,797,263

SYSTEM AND METHOD FOR RECORDING AND REPRODUCING RECORDS

Filed Nov. 19, 1952 2 Sheets-Sheet 1

INVENTORS
RAY MILTON DOLBY
LOUIS L. FISHER
JOHN M. WERNLI
BY Flehr & Swain
ATTORNEYS INVENTORS
RAY MILTON DOLBY
LOUIS L. FISHER
JOHN M. WERNLI
BY Flehr & Swain
ATTORNEYS

United States Patent Office 2,797,263

Patented June 25, 1957

2,797,263

SYSTEM AND METHOD FOR RECORDING AND REPRODUCING RECORDS

Ray Milton Dolby, Redwood City, Louis L. Fisher, San Carlos, and John M. Wernli, Menlo Park, Calif., assignors to Ampex Electric Corporation, Redwood City, Calif., a corporation of California Application November 19, 1952, Serial No. 321,456

9 Claims. (Cl. 179—100.1)

This invention relates generally to systems and methods for recording sound or other signals, on an elongated magnetic record medium, such as magnetic tape, and for reproducing such records.

Conventional systems for recording and reproducing records on magnetic tapes make use of separate synchronous motors which are arranged to move the record medium, and which are driven from available sources of alternating current, such as the commercial 60 cycle alternating current supply lines. The accuracy with which the record is reproduced is therefore dependent in part upon the frequencies of the currents used for driving the synchronous motors. Greater accuracy can be obtained by the use of standard frequency generators to generate alternating currents for recording and playback operations. However, here again the accuracy with which the record is driven is dependent upon the accuracy with which two separate generators are operated. Slight inaccuracies of each generator may be additive to provide serious inaccuracies in reproduction. The accuracy in reproduction is also limited by changes in tape length between the time the recording was made and time of reproduction. A plastic magnetic tape may change its dimensions as much as 1% due to variations in temperature, humidity, and mechanical stress. Inaccuracy may also be caused by mechanical slippage between the tape and its driving capstan.

It is an object of the present invention to provide a novel system and method of the above character which will make possible a high degree of accuracy in driving the magnetic tape or other medium for record reproduction.

Another object of the invention is to provide a system and method of the above character having provision for preventing disruption because of any slight interruption in the reproduced control frequency employed.

Another object of the invention is to provide a novel system and method of the above character that provides a correcting voltage which is used to correct the speed with which the record medium is driven during reproducing operations.

Additional objects and features of the invention will appear from the following description in which the preferred embodiments have been set forth in detail in conjunction with the accompanying drawing.

Referring to the drawing.

Figure 1:
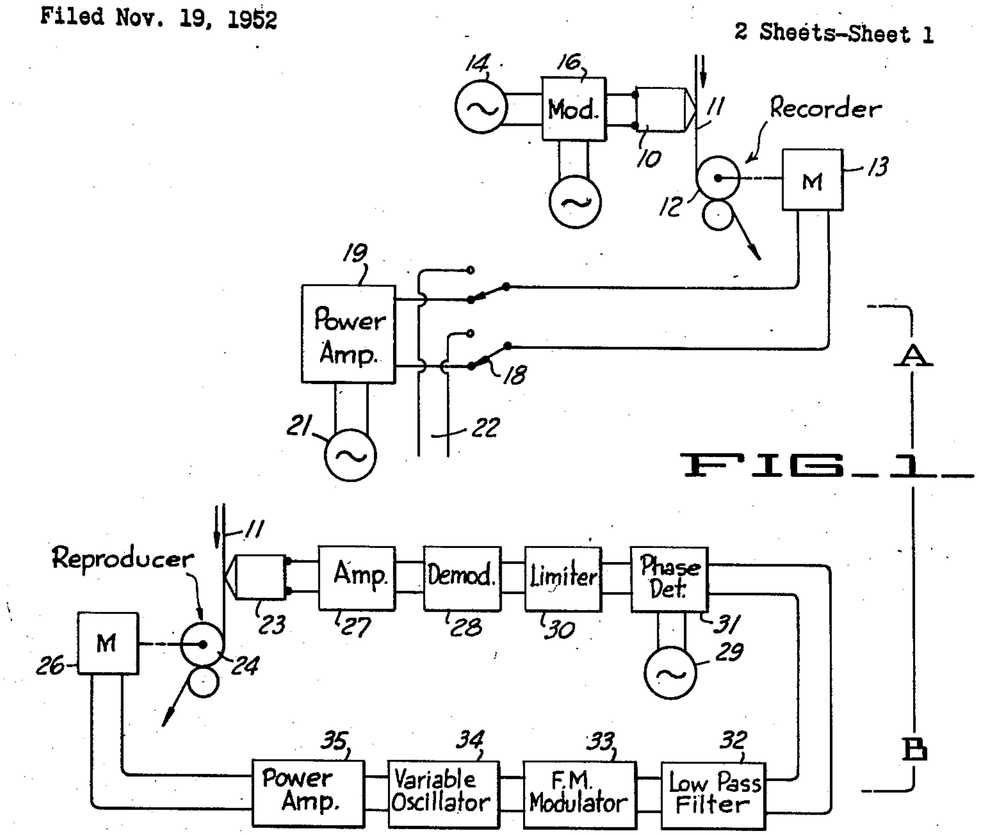
Figures 1A and 1B are schematic views which, when taken together, illustrate a complete system incorporating the present invention.

Referring to Figure 1A we have schematically illustrated record recording mechanism including a recording magnetic head 10, which is disposed adjacent the magnetic tape 11. The tape is driven by the capstan 12, which in turn is rotated by the alternating current synchronous motor 13. A carrier frequency source 14 connects to the magnetic head 10 through the modulator 16. The carrier wave is amplitude modulated by a frequency standard which may be the same standard used to drive the motor 13, or may be a separate independent standard. For one position of the switch 18 the motor 13 can be supplied with alternating current from the output of the power amplifier 19, which is excited by the standard frequency generator 21. By shifting the position of switch 18, current can be supplied from the available current supply lines 22, which for example may be the standard 60 cycle alternating current supply. For the more exacting requirements it is desirable to use a standard frequency generator.

While the tape or other medium 11 is being driven by the motor 13, one or more sound or signal records are being made on one or more channels for subsequent reproduction, along with the carrier wave modulated by a frequency standard.

The reproducing mechanism makes use of the magnetic head 23, together with the driving capstan 24 and the motor 26 for turning the capstan. One or more additional magnetic heads can be provided for reproducing the other record channel or channels. The magnetic head 23 connects with the amplifying means 27 whereby the reproduced modulated carrier is amplified and supplied to the demodulator 28. The output of the demodulator corresponds in frequency to that of the frequency standard used to modulate the carrier when the record was being made.

A standard frequency generator 29 operates with the same frequency and accuracy as that used to modulate the recorded carrier. Generally the same standard frequency is used for both purposes. The output of the demodulator is applied to the limiter 30 to provide limited output voltages of square wave form. The voltages from the limiter 30 and from the standard frequency generator 29, which are likewise of square wave form, are applied to the phase detector 31. In this phase detector the frequency reproduced from the tape is compared with the frequency from the standard frequency generator. If the reproduced frequency from the tape should become slightly higher than that of the standard generator, the limiter 30 output wave advances in phase with respect to the standard wave from 29. Conversely, if the reproduced frequency should become lower, the limiter output wave lags in phase with respect to the standard. The phase detector maintains a direct current output voltage which is proportional in sign and magnitude to the phase angle between the two applied waves. This output is used in such a way that for an advance in phase, which indicates that the reproduced frequency is higher than the standard, the speed of the drive motor 26 will decrease, thus reducing the reproduced frequency until it is the same as the standard. Conversely, a lag in phase increases the drive motor speed. Thus, the drive motor is constantly maintained at whatever speed is necessary to keep the reproduced frequency exactly the same as that of the standard frequency generator.

The phase detector output voltage controls the drive motor speed in the following manner. Undesired frequency components of the output of phase detector 31 are removed by the low pass filter 32, and the output is then applied to the FM modulator 33. The output of this modulator is applied to the variable frequency oscillator 34. The output of the variable frequency oscillator 34, after being amplified by the power amplifier 35, is used for driving the motor 26. The FM modulator 33, together with the oscillator 34, can be equipment making use of a vacuum tube reactance controlled by the output from the phase detector. Variations in reactance can serve to vary the frequency of operation of the oscillator. Thus, a frequency is supplied to the motor 26 which varies in accordance with the magnitude and polarity of the output voltage from the phase detector 31.

In a typical instance the frequency of the carrier used in recording can be 18,000 C. P. S. The frequency of the current supplied to the motor 13, and for modulating the carrier, can be 60 C. P. S. The output of demodulator 28 therefore has a mean frequency of the standard generator 29. The frequency supplied to the motor 26 is 60 cycle plus, or minus, depending upon the voltage magnitude and polarity of the output from the phase detector 31.

Figure 2:
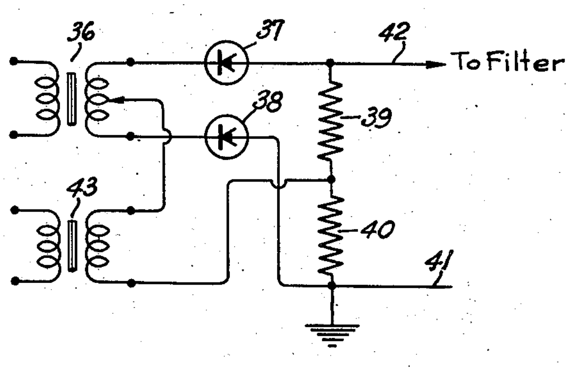
Figure 2 is a circuit diagram illustrating an electronic phase detector which is suitable for use in the system of Figure 1B.

A suitable phase detector of the electronic type is illustrated in Figure 2. A transformer 36 has its secondary connected to the cathodes of the diodes 37 and 38. The diodes have their anodes connected across the load resistors 39 and 40, which connect from the grounded conductor 41, to the output conductor 42. A second transformer 43 has one terminal of its secondary connected to a center tap on the secondary of transformer 36. The other secondary terminal of transformer 43 connects to the point of connection between resistors 39 and 40.

Operation of the phase detector illustrated in Figure 2 is as follows: The frequency standard voltage is applied to the primary of transformer 43, and the reproduced signal from the limiter 30 is applied to the primary of transformer 36. The voltage developed across each half of the secondary of transformer 36 will either add to or subtract from the secondary voltage of transformer 43, depending upon the instantaneous polarity relationship of the two signals. The average current through each of the diodes 37 and 38 will depend upon the length of time during each cycle that their applied voltages are of additive or subtractive polarity. This in turn is dependent upon the phase angle between the two applied waves. When the phase angle is 90° or 270° the average currents through the diodes are equal, and equal voltages of opposite polarity will be developed across the load resistors 39 and 40. Hence, the net voltage between conductor 42 and ground will be zero. If the phase angle departs from 90° or 270° the average diode currents will become unbalanced, and the net output voltage between conductors 42 and 41 will no longer be zero. The output voltage polarity will depend upon whether the phase angle is leading or lagging the 90° or 270° relation, and the magnitude will be proportional to the amount of lead or lag. Assuming that the applied frequencies are of square wave form, a linear relation between output voltage and phase angle is obtained over a range of 180°. Since the currents through the diodes are in the form of pulses, it is necessary to provide the low pass filter 32 between the phase detector output and the FM modulator, whereby only a direct current voltage proportional to the average currents is applied to the modulator.

The overall operation of the system is as follows: At the time a record is being made, a control frequency is recorded by the magnetic head 10, in addition to one or more additional record tracks which may be recorded on one or more separate channels. When the record is reproduced the driving motor 26 is driven by power supplied from the variable frequency oscillator 34 and the power amplifier 35. The frequency of the power supply is controlled in accordance with the polarity and magnitude of the current output from the phase detector 31 and this in turn is responsive to any difference in phase between the standard generator frequency 29, and the recorded control frequency. Assuming that the reproduced control frequency may advance slightly with respect to the standard frequency, a correcting voltage from the phase detector 31 modifies the frequency of the oscillator 34, to effect a slight compensating reduction in the frequency of the current applied to the motor 26. This serves to bring the reproduced frequency back until it is exactly the same as the standard.

It will be evident that the system and method described above makes possible highly accurate reproduction of recorded frequencies. It is independent of such factors as tape stretch or shrinkage due to mechanical stresses or variations in temperature or humidity, mechanical slippage of the tape with respect to the driving mechanism, or variations in frequency which may occur from time to time in the current used for driving the recorder motor 13, or the reproducing motor 26.

Figure 3:
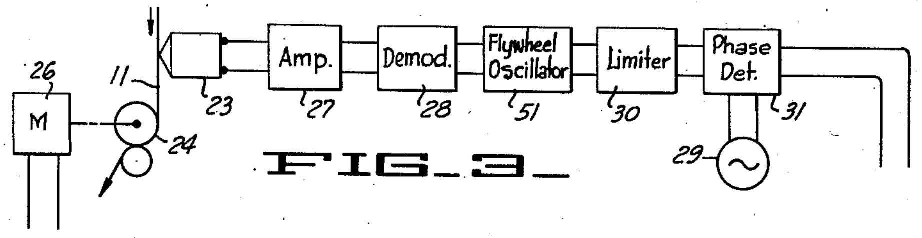
Figure 3 illustrates a modification of Figure 1 to incorporate a so-called flywheel oscillator.
Figure 4:
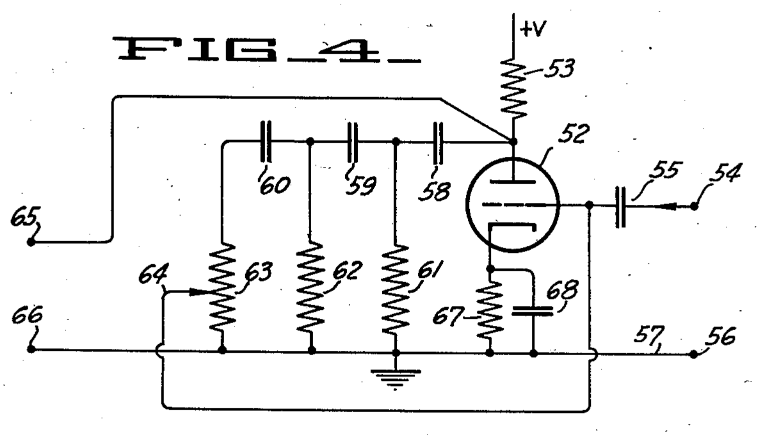
Figure 4 is a circuit diagram illustrating a suitable oscillator which can be used for the flywheel oscillator of Figure 3.

Under certain conditions of operation the recorded control frequency may be subjected to momentary interruptions. Such an interruption may cause a failure of the correcting voltage such as to interfere with maintenance of the desired automatic control. To avoid this result we can use the system illustrated in Figure 3. In this modification a so-called flywheel or continuity oscillator 51 is inserted between the demodulator 28 and the phase detector 31. A suitable oscillator for this purpose is illustrated in Figure 4. It consists of a vacuum tube 52 having its plate connected to a source of voltage through the resistor 53. The input terminal 54 is coupled to the control grid of tube 52 through the condenser 55, and the other input terminal 56 is connected to the grounded conductor 57. A capacitance-resistance tuned network connects between the plate and the grounded conductor 57, and includes the condensers 58, 59, 60 and the resistors 61, 62 and 63. An adjustable tap 64 is connected to the control grid, and can be adjusted to control the grid excitation of the tube. The output terminals 65 and 66 are connected to the plate of the tube 52, and to the grounded conductor 57. The cathode of the tube 52 is shown connected to the ground conductor 57 in series with the biasing resistor 67, which is shunted by the bypass condenser 68.

In operation the oscillator is adjusted to have relatively low gain. The frequency of operation corresponds to the mean control frequency, the arrangement being such however that the output frequency will follow that of the applied input frequency from the demodulator 28. In the event there is a momentary interruption of current from the detector 28, for a period of say less than 10 cycles, the voltage applied to the phase detector 31 does not fail, but such voltage is maintained by the flywheel oscillator. Thus the continuity of the correcting current is maintained to continue the system operating in the manner desired.

Figure 5:
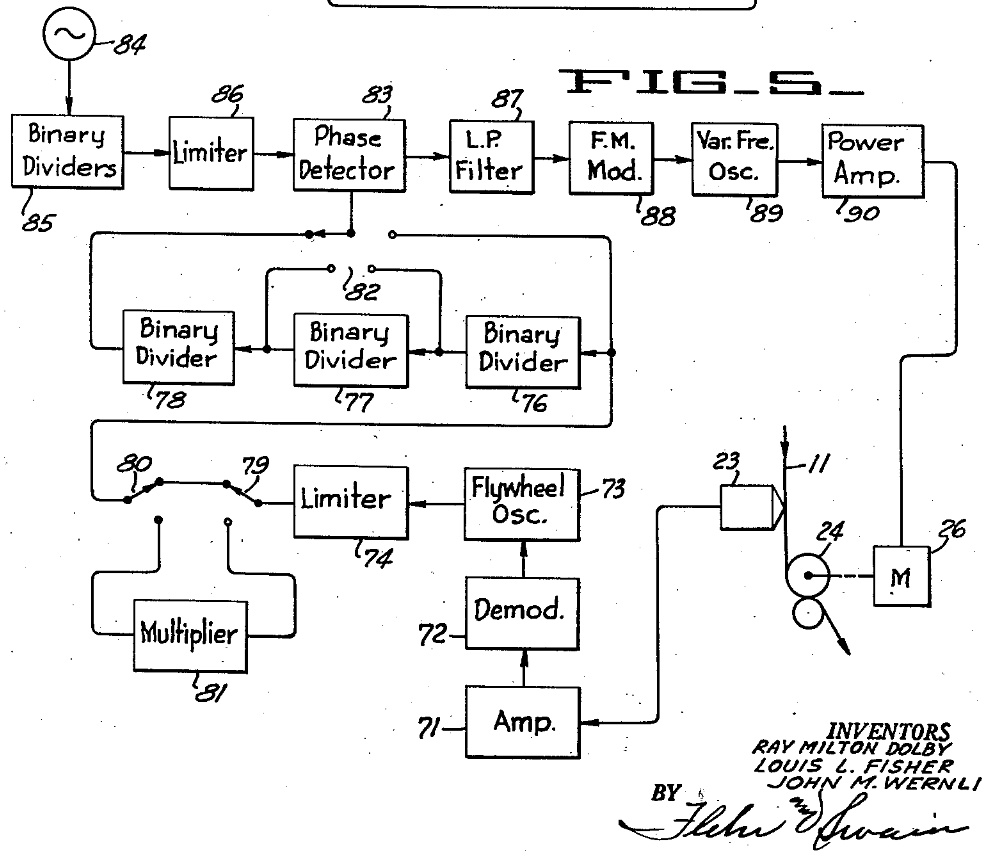
Figure 5 is a block diagram illustrating another embodiment of the invention which can be used when the tape is reproduced at speeds different from that at which it was recorded.

In some instances it is desirable to construct a system which can be operated upon any one of a plurality of control frequencies. This is necessary when it is desired that a record be reproduced at a speed which is an exact multiple or submultiple of the speed used to make the recording. A system of this character is illustrated diagrammatically in Figure 5. In this embodiment the magnetic head 23 connects to the amplifier 71, and the output of the demodulator 72, which connects to the amplifier is applied to the flywheel oscillator 73. Signals from the flywheel oscillator 73, after passing through the limiter 74, are applied to a frequency divider system which can include binary dividers 76, 77, and 78. By means of switches 79 and 80, it is also possible to apply the output of the limiter to the frequency multiplier 81. By changing the settings of the selector switches 79, 80 and 82, it is possible to convert various frequencies derived from reproducing the record at different speeds, to a single frequency suitable for use in the phase detector. The standard frequency generator 84 supplies a constant reference frequency to the binary divider 85, and the output of this divider is applied to the limiter 86 and the phase detector 83. The low pass filter 87 receives correcting voltages from the phase detector, and these currents are applied to the FM modulator 88 and variable frequency oscillator 89 to vary the frequency accordingly. The output of the variable frequency oscillator is applied to the power amplifier 90, which serves to drive the motor 26.

By way of example, it can be assumed that the reference frequency supplied by the generator 84 is 500 C. P. S. By means of binary dividers, a frequency of 62.5 C. P. S. can be derived from the 500 cycle frequency, for application to the phase detector 83. Assuming that 500 C. P. S. has been recorded as a control frequency, this is the means frequency supplied by the limiter 74 to the frequency divider system, assuming that the tape speed is the same when reproduced as when recorded. By proper positioning of the selector switch 82, 62.5 C. P. S. can be derived from the 500 cycle control frequency for application to the phase detector. The variable frequency oscillator can provide a convenient frequency for operating the motors 26, as for example, 60 C. P. S.

If the recorded control frequency is less than 500 cycles, as for example 250 C. P. S., which would be the case if the record were reproduced at one-half the recorded speed, switch 82 is shifted accordingly to supply 62.5 C. P. S. to the phase detector. Summarily the system can be adjusted to operate upon reproduced control frequencies of 166⅔ C. P. S., 125 C. P. S., 83⅓ C. P. S., 62.5 C. P. S., 41⅔ C. P. S. and 20⅚ C. P. S.

We claim:

1. In a record system of the character described making use of an elongated magnetic record medium, means including an alternating current motor of the synchronous type for driving said record medium for reproducing operations, said record medium having a constant control frequency recorded thereon for a tape movement subject to variations, means for supplying a standard frequency, means for reproducing said recorded control frequency, phase detecting means of the electronic type serving to derive voltages from a difference in phase relationship between the reproduced and standard frequencies, means for supplying an alternating current to said driving motor to drive the same, and means utilizing said derived voltages for modifying the frequency of the alternating current so supplied to the motor whereby the record medium is driven in accordance with said variations.

2. In a record system of the character described making use of an elongated magnetic record medium, means including an alternating current motor of the synchronous type for driving said record medium for reproducing operations, said record medium having a constant control frequency recorded thereon by a tape movement subject to variations, means for supplying a standard frequency of substantially square wave form, means for reproducing said recorded control frequency as a frequency of substantially square wave form, phase detecting means of the electronic type serving to derive voltages from a difference in phase relationship between the reproduced and standard frequencies, means for supplying an alternating current to said driving motor to drive the same, and means utilizing said derived voltages for modifying the frequency of the alternating current so supplied to the motor whereby the record medium is driven in accordance with said variations.

3. Apparatus as in claim 1 in which a flywheel oscillator is interposed between the means for reproducing the control frequency and the phase detector.

4. In a record system of the character described making use of an elongated magnetic record medium having recorded thereon a carrier frequency modulated with a control frequency; means including an alternating current motor of the synchronous type for driving said record medium for reproducing operations, means for generating a standard frequency, means including a demodulator for reproducing said recorded control frequency, phase detecting means of the electronic type, voltages from said demodulator and from said standard frequency being applied thereto, said phase detecting means serving to derive voltages from a difference in phase relationship between the reproduced and standard frequencies, means for generating an alternating current to drive the motor, said means including a variable frequency generator, and means utilizing said derived voltages for modifying the frequency of operation of said variable frequency generator to maintain the driving speed such that the reproduced frequency will coincide exactly with that of the standard frequency generator.

5. Apparatus as in claim 4 together with a flywheel oscillator interposed between the demodulator and the phase detector.

6. In a record system of the character described making use of an elongated magnetic record medium having a carrier frequency recorded thereon which is modulated by a control frequency, means including an alternating current motor of the synchronous type for driving said record medium for reproducing operations, means for generating a standard frequency of square wave form, means including a demodulator for reproducing said recorded control frequency in square wave form, phase detecting means of the electronic type, means for applying voltages of square wave form from the demodulator and from said standard frequency to said phase detecting means, said phase detector serving a derive voltages from differences in phase relationship between the reproduced and the standard frequencies, means including a variable frequency oscillator serving to supply alternating current to the driving motor to drive the same, means utilizing said derived voltages for modifying the frequency of operation of said oscillator to thereby modify the frequency of the alternating current supplied to the motor, and a flywheel oscillator having a mean frequency of operation corresponding to said control frequency, said flywheel oscillator being interposed between the demodulator and the phase detector.

7. Apparatus as in claim 6 together with adjustable frequency converting means interposed between the demodulator and the phase detector, said means enabling driving of the record and reproducing medium at different speeds.

8. In a record system of the character described making use of an elongated magnetic record medium having a frequency recorded thereon, means including an alternating current motor of the synchronous type for driving said record medium for reproducing operations, means for providing a standard frequency of substantially square wave form, means, for reproducing said recorded control frequency, limiter means for deriving a substantially square wave form from the record control frequency, phase detecting means of the electronic type, means for applying voltages of substantially square wave form derived from the reproduced control frequency to said phase detecting means, means for applying voltages of substantially square wave form from said standard frequency providing means to said phase detecting means, said phase detecting means serving to derive voltages from differences in phase relationships between the reproduced and standard frequencies, means including a variable frequency oscillator serving to supply alternating current to the driving motor, and means utilizing said derived voltages for modifying the frequency of operation of said oscillator to thereby modify the frequency of the alternating current supplied to the motor.

9. Apparatus as in claim 8 in which said phase detecting means comprises an input transformer, a pair of diodes having their cathodes connected to the terminals of the transformer secondary, output leads connected to the anodes of the diodes, a resistive load connected between the anodes, a second input transformer, one terminal of the secondary of the second input transformer being connected to the midpoint of the secondary of the first transformer and the other terminal being connected to an intermediate point of the resistive load, said standard frequency and said derived square wave derived from the reproduced frequency being applied to the primaries of said transformers.

References Cited in the file of this patent

UNITED STATES PATENTS

| | | |
|---|---|---|
| 1,857,451 | Hansen | May 10, 1932 |
| 1,916,510 | Hansen | July 4, 1933 |
| 1,976,355 | Mees et al. | Oct. 9, 1934 |
| 2,471,916 | Volz | May 31, 1949 |
| 2,496,103 | Neufeld | Jan. 31, 1950 |
| 2,604,321 | Williams | July 22, 1952 |
| 2,627,596 | Andrews | Feb. 3, 1953 |
| 2,709,204 | Holmes | May 24, 1955 |